United States Patent [19]

Beezley, Jr.

[11] Patent Number: 5,319,351
[45] Date of Patent: Jun. 7, 1994

[54] STOLEN VEHICLE ALARM SYSTEM AND METHOD

[76] Inventor: Thomas C. Beezley, Jr., 4508 Hillbrook Dr., Annandale, Va. 22003

[21] Appl. No.: 964,863

[22] Filed: Oct. 22, 1992

[51] Int. Cl.$^5$ ............................................. B60R 25/10
[52] U.S. Cl. .................................... 340/426; 340/430; 307/10.2
[58] Field of Search ....................... 340/426, 430, 541; 307/10.2; 342/20, 27, 28

[56] References Cited

U.S. PATENT DOCUMENTS

| | | |
|---|---|---|
| 3,906,472 | 9/1975 | Guadara et al. |
| 4,004,273 | 1/1977 | Kalogerson |
| 4,107,962 | 8/1978 | MacKinnon |
| 4,297,674 | 10/1981 | Merten |
| 4,791,420 | 12/1988 | Baba ............................ 340/554 X |
| 4,819,050 | 4/1989 | Manzoni |
| 4,885,572 | 12/1989 | Igata et al. |
| 4,933,664 | 6/1990 | Igawa et al. |
| 4,990,890 | 2/1991 | Newby |
| 5,140,890 | 8/1992 | Elion |

Primary Examiner—Jeffery A. Hofsass
Attorney, Agent, or Firm—Diller, Ramik & Wight

[57] ABSTRACT

An alarm system (10) for use with a vehicle. The system (10) monitors when the driver's seat becomes newly occupied (17) and begins a countdown, during which interval an authorized user can utilize an operator actuated switch (18) to terminate the automatic arming process. If this switch (18) is not used during the predetermined period of time, then the system (10) automatically arms itself. Once armed, the system (10) monitors reception of law enforcement radar signals through use of an appropriate detector (16). When such a signal has been detected, thereby indicating proximity of law enforcement personnel, the system (10) activates one or more alarm devices, each intended to call attention of the law enforcement persons to the vehicle in question, and/or to urge the thief into now leaving the vehicle.

16 Claims, 3 Drawing Sheets

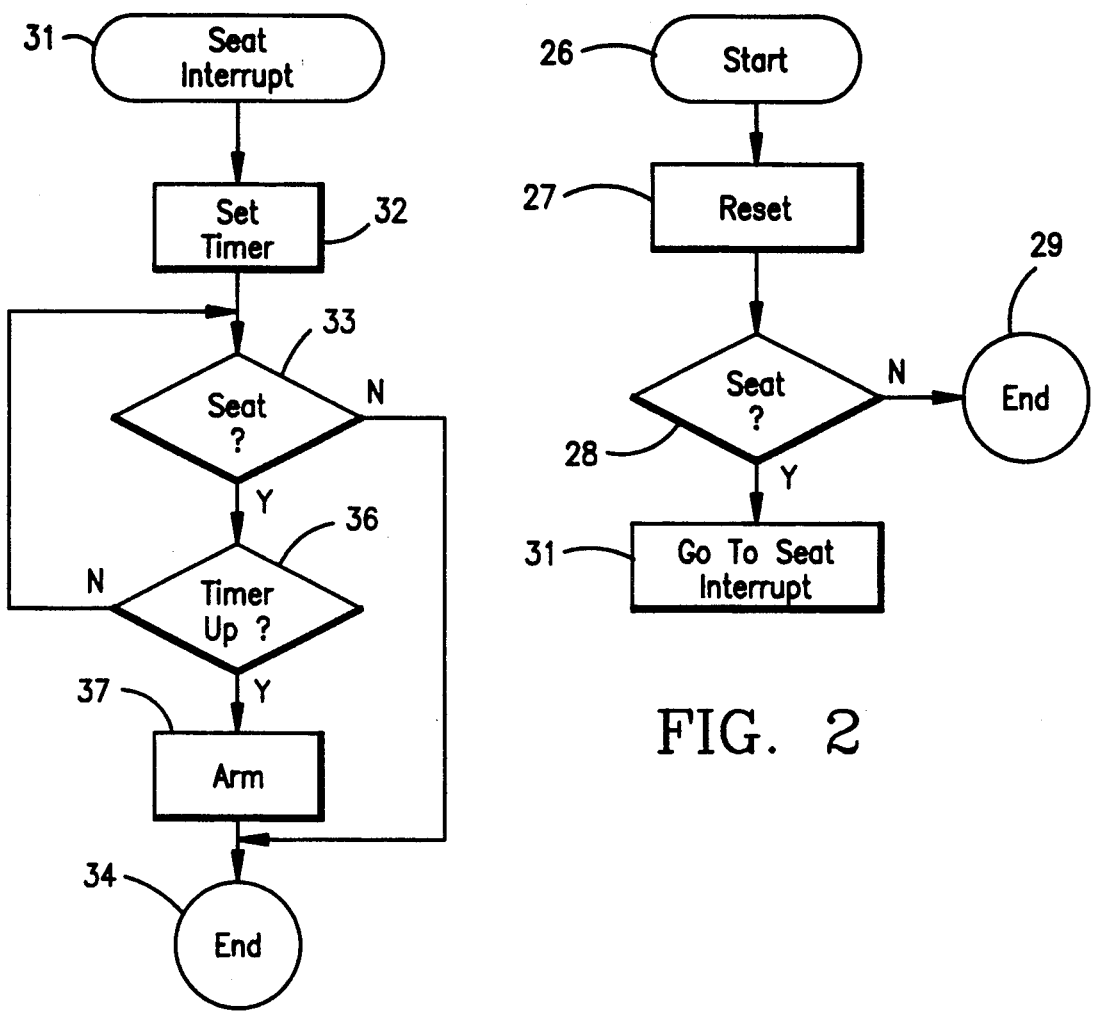

STOLEN VEHICLE ALARM SYSTEM AND METHOD

FIELD OF THE INVENTION

This invention relates generally to the field of alarm systems as used in conjunction with vehicles, and in particular, automobiles.

BACKGROUND OF THE INVENTION

Alarm systems of various kinds are well known in the prior art. Recently, more and more vehicle owners have begun to install alarm systems of various kinds in their automobiles. These alarm systems have various purposes, and hence, operate in a variety of ways.

For example, some alarm systems are primarily intended to prevent unauthorized persons from gaining access to an unattended vehicle. Other systems are primarily intended to deter an unauthorized person from stealing a vehicle by making it difficult for the vehicle in question to be easily moved to an unauthorized destination. As regards the latter situation, the unauthorized person may gain initial access to the vehicle in a variety of different contexts. For example, the thief may seek to drive the vehicle away after having gained access to an unattended vehicle. In this context, the vehicle will typically have been parked and its ignition switch will have been off. In another example, the thief may seek to gain access to control of the vehicle while the legitimate owner is currently using the vehicle. Such occurrences are known as carjackings, and are increasing in frequency.

Carjackings provide a particular challenge when seeking to provide a safe and effective alarm system. Some available alarm systems seeking to address this problem require the legitimate operator to arm the vehicle through specific actions. For example, upon being made the subject of attention by a carjacker, the legitimate operator may be required to actuate a hidden switch prior to surrendering the vehicle to the carjacker. In many circumstances, however, the legitimate operator may be precluded from taking such action, particularly since the carjacker may be cautious, and may be observing the operator carefully in this regard.

Regardless of how armed, prior art alarm systems also provide another problem when relied upon in the context of a carjacking. Prior art devices either sound their alarms instantly, or following a preset time delay. Either situation may fail to resolve the situation properly, and may even increase the danger faced by the legitimate operator. One primary concern here is that the alarm will sound, and there will be no one nearby who can (or will) take any action to disturb the activities of the carjacker.

Vehicle location devices currently exist, and these devices, when properly installed and activated, can lead law enforcement persons to the stolen vehicle. Such devices are quite effective. Such devices are also, however, quite expensive, and beyond the financial wherewithal of many persons. A need therefore exists for a stolen vehicle alarm system that at least substantially avoids these and other problems found in the prior art, while simultaneously providing assurances that the perpetrator will likely be brought to the attention of appropriate law enforcement personnel. Such a system should preferably be relatively inexpensive to purchase, install, and operate.

SUMMARY

These needs and others are substantially met by the system and method disclosed herein. Pursuant to this embodiment, the stolen vehicle alarm system is used with a vehicle having an ignition switch, an operator seat, and a battery. The system itself includes an alarm, a law enforcement personnel detector, a sensor for sensing when someone has begun to use the vehicle, and a controller that operably couples to the above, and that operates under certain circumstances to enable the alarm when someone is using the vehicle while proximal to law enforcement personnel.

In one embodiment, the law enforcement personnel detector comprises a law enforcement radar detector. So configured, when the detector detects the presence of law enforcement radar signals, and hence the relative proximity of law enforcement personnel that are typically associated with such radar signals, the alarm is enabled, thereby attracting the attention of the law enforcement personnel, and increasing the likelihood that the theft of the vehicle will be thwarted.

In another embodiment, the system is armed as soon as someone sits in the driver's seat. Response of the system to detection of law enforcement radar signals, however, (to they extent they might be present) is delayed until a predetermined period of time has passed. So configured, a thief will be able to take command of the vehicle in question, and drive away from the owner, before the alarm mechanism will become armed, thereby avoiding additional risk to the owner.

BRIEF DESCRIPTION OF THE DRAWINGS

These and other attributes of the invention will become more clear upon reviewing the following detailed description, particularly when considered in conjunction with the drawings, wherein:

FIG. 2 comprises a flow chart depicting operation of certain aspects of the system in accordance with the invention;

FIG. 3 comprises a flow chart depicting operation of certain aspects of the system in accordance with the invention;

DETAILED DESCRIPTION OF A PREFERRED EMBODIMENT

Figure 1:
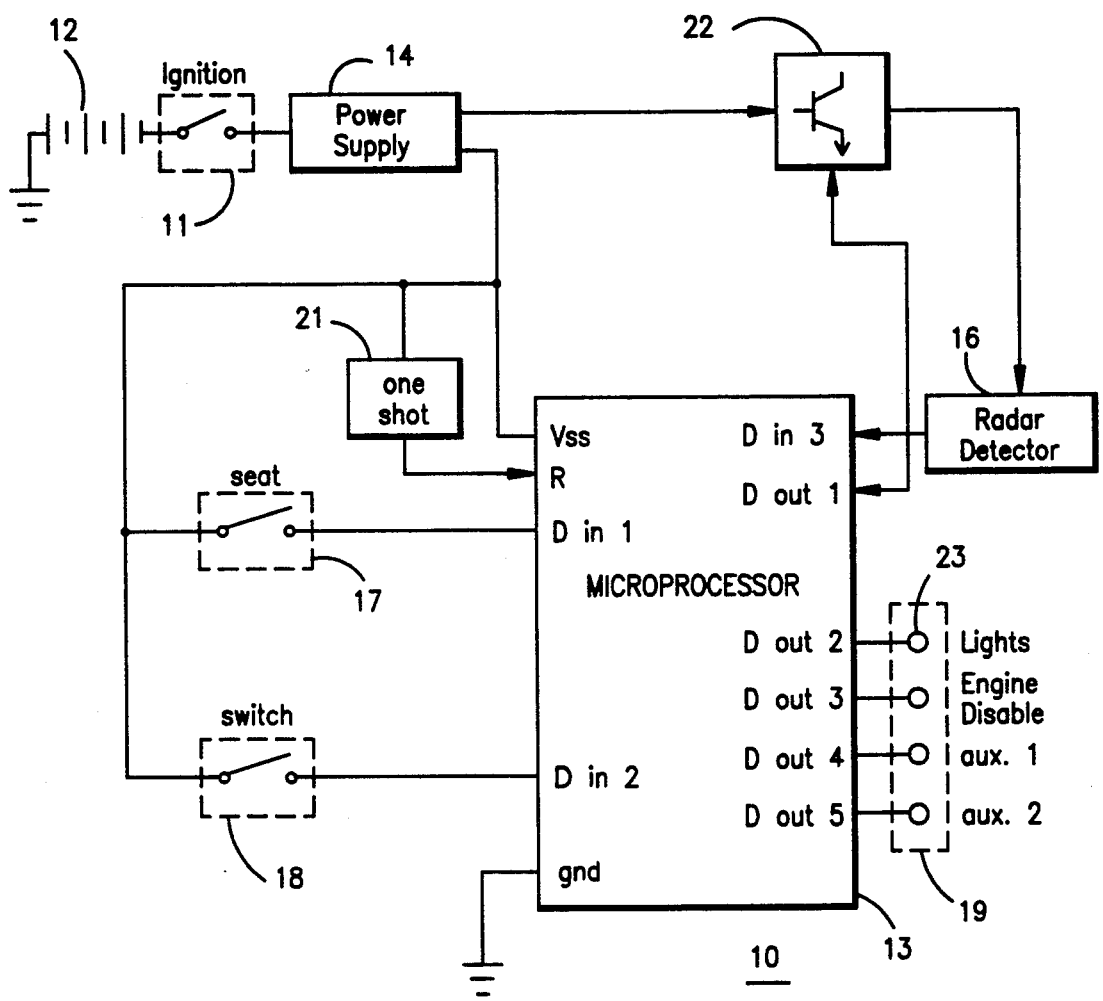
FIG. 1 comprises a block diagram depiction of a vehicle alarm system configured in accordance with the invention.

Referring now to the drawings, and in particular to FIG. 1, the system can be seen as generally depicted by the numeral 10. The system 10 operates in conjunction with a vehicle (such as an automobile) (not shown), which vehicle has an ignition switch 11, a battery 12, and an operator seat (not shown) (in this case, the operator seat is the driver's seat). The above known elements of a vehicle are well understood in the art, and hence no more details need be provided here regarding these elements.

The system 10 includes generally a controller 13 (provided here through use of a microprocessor, such as an MC68000 family device as manufactured by Motorola, Inc.), a power supply 14, a radar detector 16, a seat sensor 17, an operator actuated switch 18, and various alarm devices 19. Each of these components will now be described in more detail.

The controller 13 functions to receive information regarding the status of the ignition switch 11, the seat sensor 17, the operator actuated switch 18, and the radar detector 16. In response to these inputs, and in accordance with the programming described below in more detail, the controller enables various alarm devices and/or enables other theft-responsive actions. Appropriate coupling to the above noted components will be described below where appropriate.

The power supply 14 can be any of a variety of known such devices. In this particular embodiment, the power supply 14 connects through the ignition switch 11 to the battery 12 (which is presumably a 12 volt battery), and provides two outputs based on this input: a 5 volt DC regulated supply suitable for use by the controller 13 and other devices in the system, and a 12 volt regulated supply suitable for use by the radar detector 16 and for possible use by alarm devices as well. In particular, the 5 volt output couples to the Vss port of the controller 13, and also to a one shot multivibrator 21 that connects to the reset port of the controller 13. So configured, the controller 13 will be automatically reset every time the ignition switch 11 is used to start the corresponding monitored vehicle. Such power supplies are well understood in the art, and hence, no more detailed description need to be provided here.

The radar detector 16 can be any of a variety of known law enforcement radar signal detectors. Such detectors can detect and provide a signal responsive to reception of a variety of law enforcement radar signals. Such a signal, of course, serves as an indication that one or more law enforcement individuals is proximal to the vehicle itself (it being understood that "proximal" in this context means that the vehicle is near, or soon likely to be near, the law enforcement personnel who are operating the radar device itself). Generally speaking, if the detector 16 is equipped with a sensitivity control, the sensitivity should be set lower rather than higher. This aids in assuring that the detector will only respond when proximity to law enforcement personnel is more likely. In this embodiment, the output of the detector 16 is provided to the controller 13 at an appropriate data input port. A high signal at this port indicates that a law enforcement radar signal has been detected.

Also in this embodiment, the power to the detector 16 passes through a switch 22, which switch 22 is controlled by the controller 13. So configured, the controller 13 can control the activated/inactivated operating status of the detector 16 in a manner to be described in more detail below.

The seat sensor 17 and the operator actuated switch 18 each connect to real time interrupt ports on the controller 13 in accordance with well understood prior art technique. So configured, a signal appearing at either port (when either switch closes or opens) will immediately cause the controller 13 to execute an associated subroutine that corresponds to the interrupt. In this way, the controller 13 can respond immediately whenever the operator actuated switch 18 is actuated by an operator, or whenever someone sits in the operator seat. The operator actuated switch 18 itself may be a simple push button switch that is ordinarily biased open. This switch should be mounted where it is easily accessible by an authorized driver, but also where it is relatively unobvious and likely to be unnoticed by an unauthorized person. The seat sensor 17 may be any of a variety of pressure sensitive switches, and should be located where it will be closed whenever someone is sitting in the driver's seat of the vehicle. Just as importantly, this switch should also open whenever no one is sitting in the driver's seat. In this way, the switch 17 will reliably indicate whether anyone is sitting in the driver's seat of the vehicle.

The controller 13 has a plurality of outputs. In this embodiment, one output is coupled to enable activation of the emergency lights 23 of the vehicle. So coupled, the controller 13 can control the activation of the vehicle's emergency lights, which are, of course, quite visible from the exterior of the vehicle. Another output of the controller 13 can be coupled to an engine disabling device. A variety of such devices are known, and may be used in this application. So configured, the controller 13 can control when the engine for the vehicle is selectively disabled. Also, other outputs are provided, which outputs can be used to control other alarm devices, such as horns, sirens, other lights, prerecorded messages, and so forth. Such devices are intended to either drive the unauthorized person from the vehicle, to prevent the unauthorized person from operating the vehicle any longer, or to attract as much attention as possible to the vehicle while proximal to law enforcement personnel.

Referring now to FIG. 2, the first of a series of flow charts detailing operation of the controller 13 will now be described. In FIG. 2, the startup routine 26 for the controller 13 begins with a reset operation 27, following which the controller 13 determines whether the operator seat is currently occupied 28. If the seat is presently unoccupied, the startup routine concludes 29. If, however, the seat is occupied, then the seat interrupt routine 31 is begun.

Referring now to FIG. 3, the seat interrupt routine 31 will be described. (Whenever the seat sensor 17 detects that someone has newly occupied the driver's seat, or when the controller 13 independently calls up the routine as described above, this routine is run.) This routine 31 begins by setting a timer 32. Next, the process determines whether the operator's seat remains occupied 33. If not, the process concludes 34. When the seat remains occupied, however, the process determines whether the timer has reached a predetermined point (in this embodiment, five minutes). 36. When this point in time has been reached (and presuming that the operator actuated switch has not been actuated, as described below in more detail), the controller 13 calls up the arming routine 37.

Figures 4, 5:
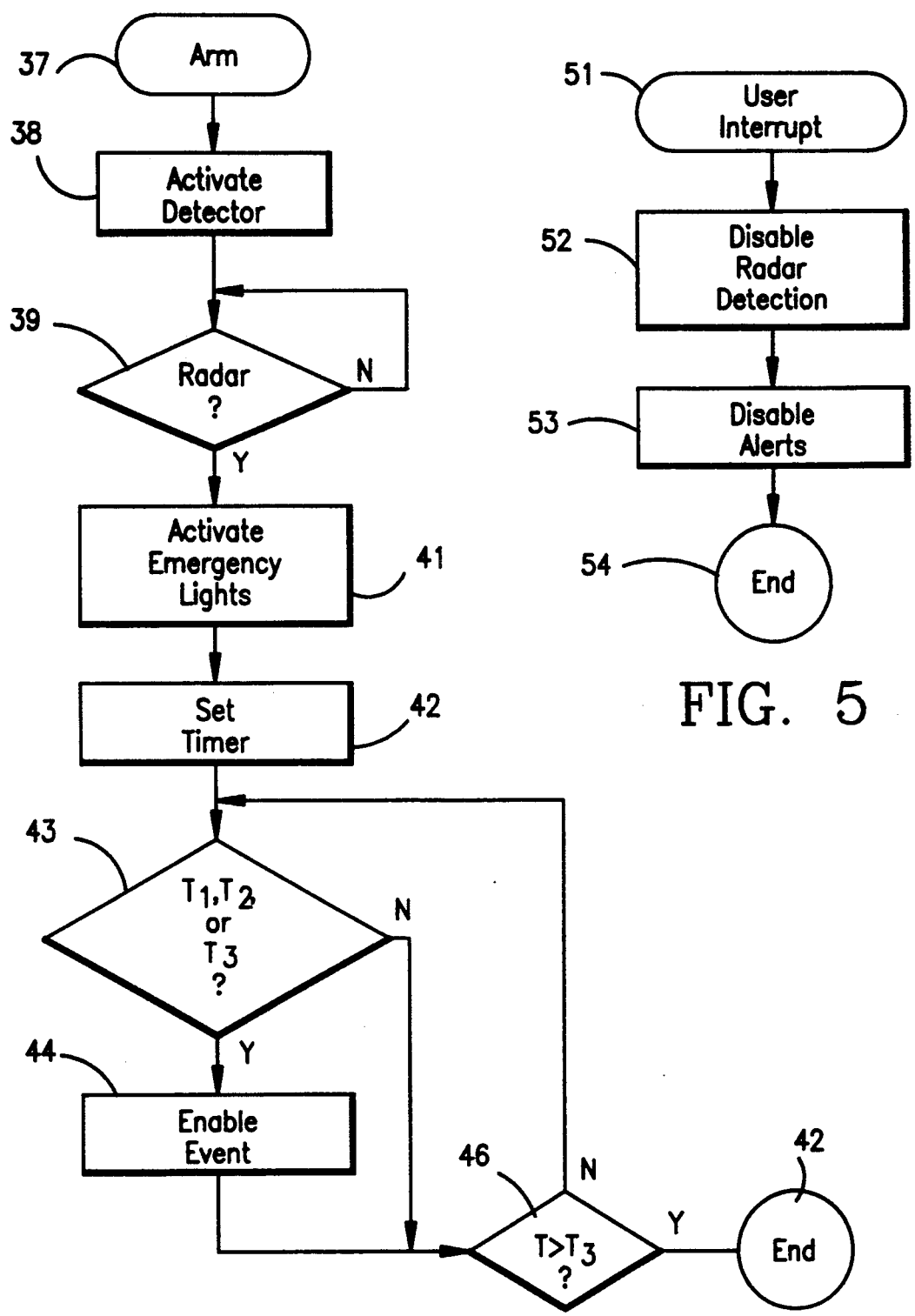
FIG. 4 comprises a flow chart depicting operation of certain aspects of the system in accordance with the invention.
FIG. 5 comprises a flow chart depicting operation of certain aspects of the system in accordance with the invention.

Referring now to FIG. 4, the arming routine 37 begins by providing power 38 to the radar detector 16 (through appropriate closure of the corresponding switch 22 as described above), and then monitors the radar detector input to determine if law enforcement radar signals are being received 39. When such signals are received, thereby indicating proximal juxtapositioning of the vehicle with respect to law enforcement officers, the emergency lights are activated 41. Such lights provide an externally viewable signal that will draw attention to the vehicle, and likely attract the attention as well of the law enforcement officers that are in the area. Importantly, should the thief notice that the emergency signals are blinking, he or she cannot deactivate them by resort to the usual emergency signal light control, as the controller 13 is nonresponsive to that control. The lights can only be stopped by operating the operator actuated switch 18, or by switching the ignition of the vehicle off (if desired, of course, the power supply coupling to the controller 13 can be made to bypass the ignition switch under such circumstances—so configured, even switching the ignition switch off would not terminate the blinking of the emergency lights).

Next, the arming routine initiates a timer 42. Subsequently, a variety of time intervals can be monitored 43, and as various times are reached, various events can be enabled 44 in a predetermined fashion. For example, the engine disabling mechanism can be enabled at time T1 (for example, one minute after the timer was set). So configured, a predetermined time after the vehicle began to provide externally visible indicia to call attention to the vehicle itself, the engine will stop, thereby making it more likely that the law enforcement persons in the area will be able to recover the vehicle and hopefully also capture the thief. At some point in time, the last timed event will have occured 46, and the process will conclude 47.

FIG. 5 depicts a subroutine that is particularly useful in certain embodiments of the present invention. Here, anytime the operator actuated switch 18 is closed by the operator, the controller 13 calls up this real time interrupt process 51. When run, this subroutine 51 disables 52 the radar detector 16 (by opening the corresponding switch 22) and disables 53 any alarm mechanisms that were previously enabled, following which, the routine concludes 54. So configured, operation of the switch 18 during the predetermined period of time following when a person sits in the driver's seat will terminate the seat interrupt routine 31, and thereby effectively preclude arming of the system. Further, operation of the switch 18 after the predetermined period of time will disable the previously enabled radar detector 16, and further silence any alarms 19 that were previously enabled.

A number of important benefits are obtained through use of the above described system and method. The system is comprised of relatively available and inexpensive components, and hence can be manufactured and installed for a significantly smaller cost than many existing protective devices. Also, since the system operates by automatically arming itself every time someone newly sits down in the driver's seat (as will occur in a carjacking incident), the system does not require the authorized user to take any affirmative action to ensure that the alarm system will operate, thereby avoiding many of the problems associated with prior art devices. Most importantly, the system 10 begins to provide its various alarms only when likely proximally located to law enforcement personnel, when such alarms will likely do the most good.

I claim:

1. A stolen vehicle alarm system for use with a vehicle having an ignition switch, an operator seat, and a battery, the system comprising:
   A) an alarm;
   B) detector means used by personnel for emitting a signal remote from an associated vehicle
   C) sensing means for sensing when someone has begun to use a vehicle that is being monitored;
   D) control means operably coupled to the alarm, the detector means, and the sensing means, for responding to the sensing means and to the emitted signal of the detector means and thereby enable the alarm to alert personnel that the vehicle has likely been stolen when the vehicle is proximal to law enforcement personnel; and
   E) switch means operably coupled to the control means for selectively rendering the alarm inoperative.

2. The stolen vehicle alarm system of claim 1, wherein the detector means comprises a radar detector.

3. The stolen vehicle alarm system of claim 1, wherein the alarm includes flashing lights that are viewable externally of the vehicle that is being monitored.

4. The stolen vehicle alarm system of claim 1, and further including a timer, and wherein the control means is responsive to the timer such that operation of the control means will be delayed at least a predetermined period of time following when the sensing means senses that someone has begun to use the vehicle that is being monitored.

5. A stolen vehicle alarm system for use with a vehicle having an ignition switch, an operator seat, and a battery, the system comprising:
   A) an alarm;
   B) a law enforcement radar detector;
   C) seat sensing means for sensing when someone is sitting in the operator's seat;
   D) an operator switch;
   E) control means operably coupled to the ignition switch, the operator switch, the alarm, the law enforcement radar detector, and the seat sensing means, for:
      i) operating in a first mode of operation whenever:
         the ignition switch is on; and
         an operator has been continuously sitting in the operator seat for less than a predetermined continuous period of time, during which first mode of operation the alarm is not enabled;
      ii) operating in a second mode of operation whenever:
         the ignition switch is on;
         an operator has been continuously sitting in the operator seat for more than the predetermined continuous period of time; and
         the operator switch has not been actuated since the operator has been continuously sitting in the operator seat, during which second mode of operation the alarm will be enabled whenever the law enforcement radar detector detects a law enforcement radar signal.

6. The stolen vehicle alarm system of claim 5, wherein the predetermined continuous period of time is five minutes.

7. A method of alerting personnel that a vehicle has likely been stolen, comprising the steps of:
   A) detecting that the vehicle has been activated;
   B) detecting that a person is sitting in a driver's seat of that vehicle;
   C) detecting when an operator switch has been actuated within a predetermined period of time following when the person begins sitting in the driver's seat;
      C1) deactivating the alarm when the operator switch is actuated;
   D) when the operator switch has not been actuated within the predetermined period of time;
      D1) monitoring for a law enforcement radar signal;
      D2) activating an alarm to alert personnel that the vehicle has likely been stolen when a law enforcement radar signal is detected;

E) when the operator switch is actuated within the predetermined period of time, monitoring when the person sitting in the driver's seat is no longer sitting in the driver's seat, and continuing from step B.

8. A method of alerting personnel that a vehicle has likely been stolen comprising the steps of:
   A) activating a stolen vehicle sensing and control system of a vehicle by an unauthorized person,
   B) said personnel emitting a signal remote from and received by the stolen vehicle sensing and control system as the stolen vehicle is being driven,
   C) sensing the emitted signal by the sensing and control system, and
   D) generating a control signal by the sensing and control system indicative that the vehicle has likely been stolen and alerting said personnel.

9. The method of alerting personnel that a vehicle has likely been stolen as defined in claim 8 wherein step A) is performed incident to an unauthorized person entering the vehicle.

10. The method of alerting personnel that a vehicle has likely been stolen as defined in claim 8 wherein step A) is performed incident to an unauthorized person sitting upon a seat of the vehicle.

11. The method of alerting personnel that a vehicle has likely been stolen as defined in claim 8 including the step of utilizing the generated control signal of step D) to actuate an alarm.

12. The method of alerting personnel that a vehicle has likely been stolen as defined in claim 8 including the step of utilizing the generated control signal of step D) to actuate lights that are viewable externally of the vehicle.

13. The method of alerting personnel that a vehicle has likely been stolen as defined in claim 9 including the step of utilizing the generated control signal of step D) to actuate an alarm.

14. The method of alerting personnel that a vehicle has likely been stolen as defined in claim 9 including the step of utilizing the generated control signal of step D) to actuate lights that are viewable externally of the vehicle.

15. The method of alerting personnel that a vehicle has likely been stolen as defined in claim 10 including the step of utilizing the generated control signal of step D) to actuate an alarm.

16. The method of alerting personnel that a vehicle has likely been stolen as defined in claim 10 including the step of utilizing the generated control signal of step D) to actuate lights that are viewable externally of the vehicle.

* * * * *